United States Patent [19]

Wulff

[11] Patent Number: 4,986,492

[45] Date of Patent: Jan. 22, 1991

[54] BIG GAME REEL AUXILIARY BRAKE

[76] Inventor: Lee Wulff, Beaverkill Rd., Lew Beach, N.Y. 12573

[21] Appl. No.: 368,255

[22] Filed: Jun. 19, 1989

[51] Int. Cl.⁵ .......................................... A01K 89/033
[52] U.S. Cl. ...................................... 242/294; 242/99
[58] Field of Search ............... 242/301, 292, 293, 294, 242/291, 323, 99

[56] References Cited

U.S. PATENT DOCUMENTS

| | | | |
|---|---|---|---|
| 683,940 | 10/1901 | Howe | 242/292 |
| 730,457 | 6/1903 | Howe | 242/291 |
| 1,379,692 | 5/1921 | Pflueger | 242/294 |
| 1,544,671 | 7/1925 | Maury | 242/292 X |
| 2,333,632 | 11/1943 | Benson | 242/301 X |
| 3,467,336 | 9/1969 | Appleton | 242/323 X |
| 3,670,985 | 6/1972 | Morishita | 242/294 X |
| 3,986,679 | 10/1976 | McMickle | 242/292 |

Primary Examiner—Katherine Matecki
Attorney, Agent, or Firm—Handal & Morofsky

[57] ABSTRACT

An improved fishing reel having a rim acting reel brake is disclosed. The presence of a transverse handle, placement of the brake on the reel and the mechanical advantage gained about the pivot provide for sufficient braking ability for use during big game fishing. The reel brake allows instantaneous response and the "feel" for the fight, provided by the brake, aids in the control of the fisherman while fighting a fish.

22 Claims, 2 Drawing Sheets

BIG GAME REEL AUXILIARY BRAKE

TECHNICAL FIELD

This invention relates to a device for use in fishing. In particular, this invention relates to a device providing a spool brake for use with big game fishing reels.

When fishing for big game fish, often times the line used is of insufficient strength to withstand the full strength exerted by a large fish during its panic runs. In particular, the tension put on the fishing line when a big fish is running or changing direction will often times exceed the tensile strength of the line, cause the line to fail and the fish to be lost.

When big game fishing it is important to tire the fish out before attempting to land it. Accordingly, since the fish has limited reserves of energy, the fisherman attempts to play the fish out through constant adjustment of the restraining action of the fishing line while alternately reeling line in and letting the fish run. This is accomplished by adjusting the drag supplied by the fishing reel on the fishing line, constantly maintaining a balance between the fish's strength and the breaking strength of the fishing line. (The drag adjustment attempts to set a maximum tension on the line, at which point the spool will allow additional line out thereby preventing the tension from exceeding the maximum.) To optimize the control the fisherman has on maintaining this balance, a means is necessary that will give the fisherman instantaneously variable degrees of drag resistance supplied to the line.

BACKGROUND OF THE INVENTION

The need to supply a variable degree of drag when playing a fish has long been recognized. As a result, fishing reels traditionally have incorporated into their design means for supplying this variable drag.

Variable drag is achieved by providing a variable resistance affecting the amount of tension a reel will accept before allowing line to be paid out. Too little resistance will allow a fish too much and the chance to let the line fall slack or the reel to over run and tangle. A slack line can allow the fish to spit the hook, to recuperate or to change position underwater such that the line may be snagged and broken. Too much resistance will allow the fish to break the line through a sudden move providing momentary force greater than the tensile strength of the line. Such a sudden move may not be adequately compensated for by the drag adjustment.

The importance of the drag adjustment is apparent, as should be the fact that the same adjustment does not apply to all fish and that when playing a large game fish the requirements will change over a period of time or even from moment to moment. When a fish breaches and then tries to dart in a different direction, the demands on the line, and desired drag adjustment, will differ from those when the fish is running or being walked in. Adjustment must be made manually and is distracting. Additionally, continual adjustment, reacting as the fish moves, is not feasible with the traditional drag systems.

Inherent to conventional drag mechanism designs are relatively non-instantaneous functional aspects. As such, traditional reels make it difficult, if not impossible, to optimize the desired balance between the fish's strength, the breaking strength of the fishing line and setting the drag to allow a fish to run and tire. Thus, with traditional reels, a fisherman adjusting the drag while playing a fish must suffer a lag time in the adjustment to the unpredictable and impulsive motions of a hooked fish or is forced to try to anticipate such moves, all too often resulting in "the one that got away".

DISCLOSURE OF THE INVENTION

This invention is intended to provide a remedy. It solves the problem of how to provide instantaneous drag response in reaction to the movements of a hooked fish. This invention utilizes a lever bar on the upper side of a big game reel which, when activated by the angler, will press a brake on the outside flanges of the reel spool. By applying the braking action to the outside diameter of the relatively large reel spool, the inventive reel brake will have greater leverage than current reel brakes which brake on the lesser diameter of the spindle. The drag induced by the inventive reel brake can be released instantaneously by removing the pull of the angler's hand on the lever bar. Because of this instantaneous release of drag, the hooked fish will be able to move away without breaking the line. The reduction of drag on conventional reels is more time consuming and a hooked fish may break the line before it can be accomplished.

The reel brake is contemplated as being used with a conventional drag which may be set at the minimum resistance desired while the brake is used to exert the extra resistance to the degree required as, and when, needed.

The reel brake also allows a "feel" for what the fish is doing that aids in playing the fish and determining the proper resistance at the time it is needed.

BRIEF DESCRIPTION OF THE DRAWINGS

One way of carrying out the invention is described in detail below with reference to drawings which illustrate only a few specific embodiments of the invention and in which.

BEST MODE FOR CARRYING OUT THE INVENTION

Figure 1:
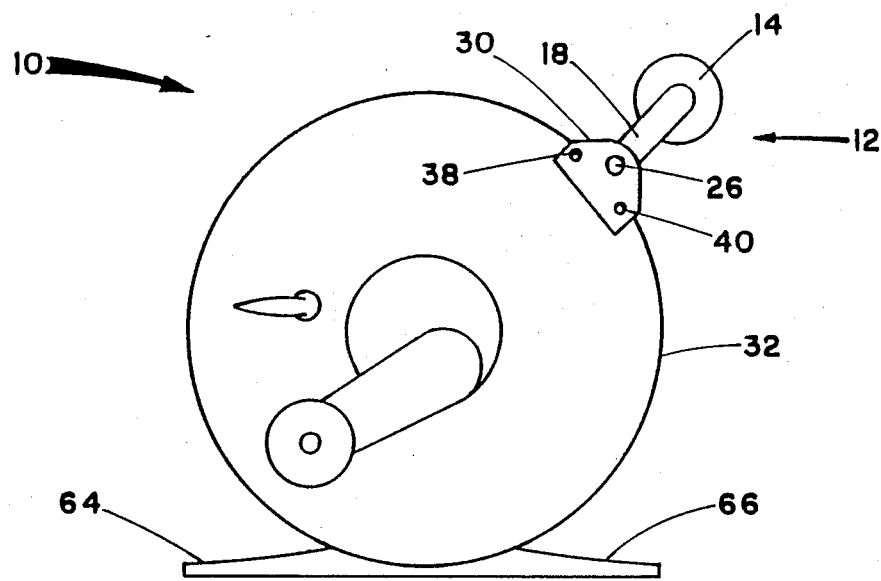
FIG. 1 is a side plan view showing a reel equipped with the reel brake.
Figure 2:
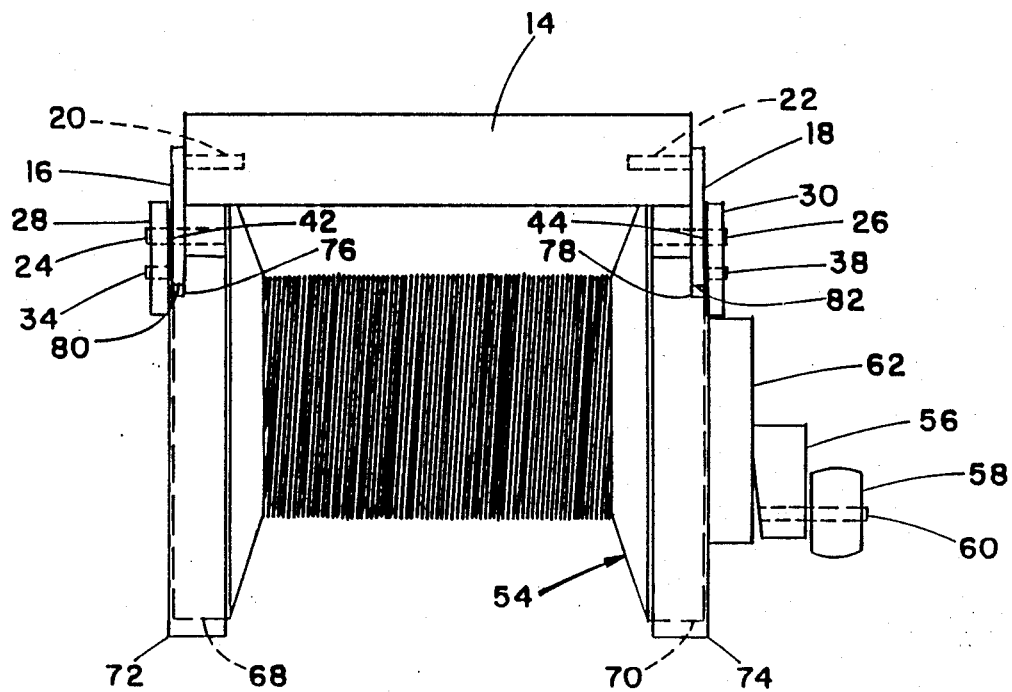
FIG. 2 is a schematic view showing the structure of an inventive reel brake in relation to the reel.

Referring to FIGS. 1 and 2, an improved fishing reel 10 incorporating a reel brake 12 constructed in accordance with the present invention is illustrated. Reel brake 12 comprises a transverse hand grip 14, which is of a diameter sufficient to enable convenient grasping by the hand of the user. Hand grip 14 is secured between a pair of lever arms 16 and 18 by being welded thereto, or through other appropriate structure. Alternatively, hand grip 14 may be mounted for rotation with respect to levers 16 and 18 by being rotatably mounted on a pair of pins 20 and 22, which in turn are secured by any appropriate means to lever arm 16 and 18.

Figure 3:
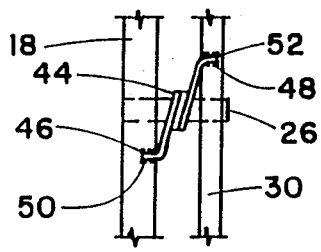
FIG. 3 is a partial side view illustrating the spring engagement.

Lever arms 16 and 18 are, in turn, mounted for rotation about pins 24 and 26. Pins 24 and 26 are securely mounted on stanchions 28 and 30. Finally, stanchions 28 and 30 are secured to the housing 32 of reel 10 by, for example, fasteners 34, and 38 and 40. A pair of coil springs, 42 and 44, are disposed around pins 24 and 26, respectively. Spring 42 has two ends, one of which is disposed in stanchion 28 and the other of which is disposed in lever arm 16, spring 42 being of the coil spring type and having its coils disposed around pin 24. In identical function but mirror-image fashion, spring 44 has two ends, 46 and 48. And 46 is disposed in a hole, 50, within lever arm 18 and end 48 is disposed in a hole 52 in stanchion 30 as illustrated most clearly in FIG. 3. In accordance with the preferred embodiment, it is contemplated that springs 42 and 44 will be under tension in the position illustrated, for example, in FIG. 3. It is also contemplated that the force necessary to displace handgrip 14 will be of the same order of magnitude as other forces experienced by the fishermen using reel 10 when he has caught a fish having the strength typically expected with the subject reel. In accordance with the preferred embodiment, although at a minimum, it is only necessary that the spring be strong to return the lever arm to the position illustrated in FIG. 1.

The remainder of the reel is of substantially conventional design incorporating a spool 54, a crank 56, a crank handle 58 mounted on a pin 60 and including a conventional drag mechanism 62 and mounting feet 64 and 66.

Figure 4:
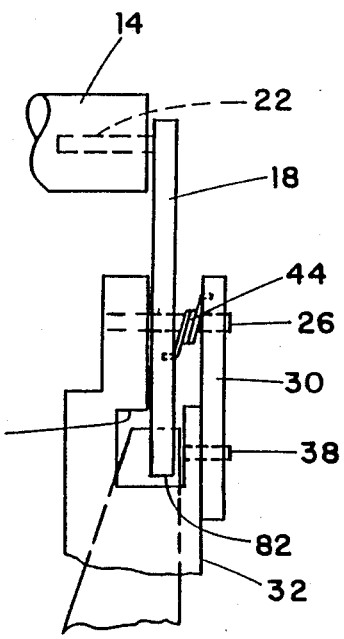
FIG. 4 is a partial side view of a reel illustrating a portion of a reel brake.

Spool 54 includes a pair of rims 68 and 70. In accordance with the embodiment illustrated in FIG. 2, rims 68 and 70 are contained within housing sidewalls 72 and 74 which include cutaways 76 and 78, which allow contact between the braking surfaces 80 and 82 of the braking ends of lever arms 16 and 18, as may be seen most clearly in FIG. 4.

The inventive reel is also equipped with a conventional drag system such as 62 in FIG. 2 upon which the minimal acceptable drag may be set with the supplementary restraint being provided as needed by the inventive braking system 12.

Figure 7:
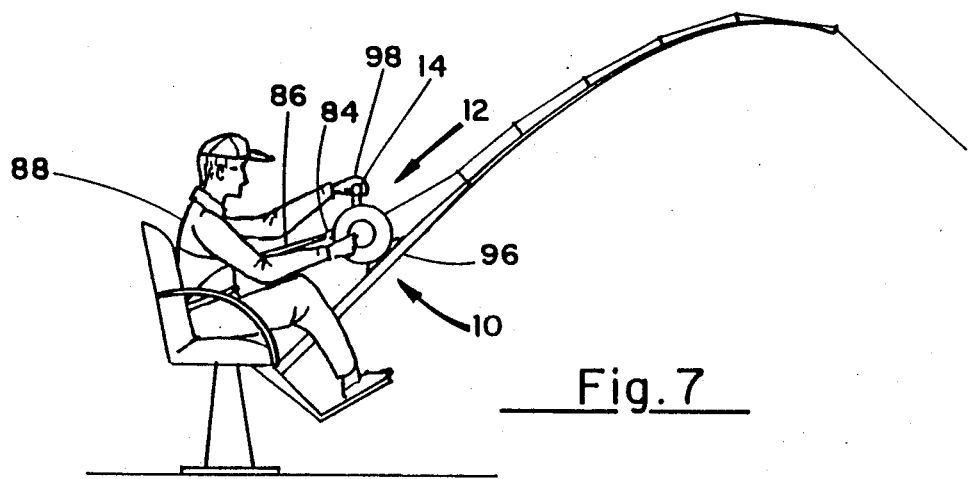
FIG. 7 illustrates the reel brake in use.

A belt hooking means 84 may also be included for securing the reel to a belt 86 disposed around the waist of the fisherman 88, as may be seen in FIG. 7.

In view of the amount of force that may be exerted, the coefficient of friction between the brake end of a lever arm and the spool rim does not have to be high and metal or ceramic ends without a material layer will be sufficient. FIG. 7 illustrates the inventive reel 10 in use. The reel brake 12 is positioned on the reel such that it is on the side away from the rod 96. The hand grip 14 is sufficiently large that an entire hand 98, as opposed to one or a few fingers, may grasp the handle comfortably.

Figure 5:
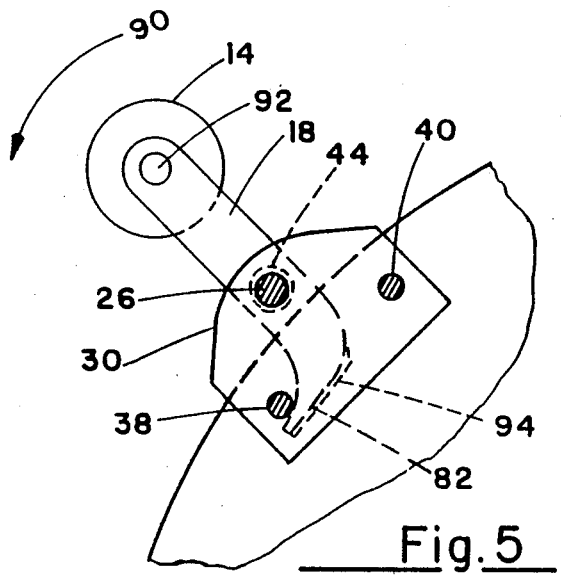
FIG. 5 is a partial rear view of a reel brake.

As is apparent, this design allows a tremendous braking force to be brought to bear on the reel spool. Besides the utilization of the strength of the whole arm, a mechanical advantage based upon the length between handle fastener 92 and pin 26 being greater than the length between braking surface 82 and pin 26 is obtained, as shown in FIG. 5. Accordingly, the materials and fastening methods must be sufficiently strong in order to withstand repeated use. Metals such as steel and some ceramics may be used.

The positioning of the brake on the half of the reel away from the rod aids in providing convenient access and allows unhindered application of force. The preferred position is about a third to a half the circumference up from the rod on the rod tip side.

Figure 6:
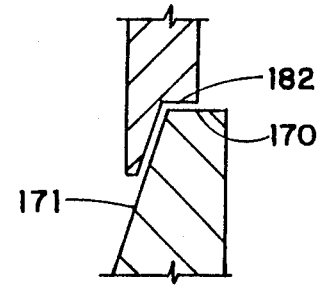
FIG. 6 is a partial sectional view showing an alternate braking structure.

A brake end 182 may be positioned and shaped so as to contact both the outer rim edge 170 and the inner sloping rim edge 171, as shown in FIG. 6.

Higher friction combinations may be desirable based upon "the feel" of the brake when in use. A comfortable "feel" is a large advantage in controlling the situation and properly playing a fish. Also, the ability to lock the reel spool in an unmoving condition can be a great advantage when dealing with a large fish that is tired and in close. Yet the pressure can be released immediately should the fish make a sudden move while close in.

FIG. 5 reveals detail from which the operation of the brake may be understood. When the handle 14 is moved in the direction of the arrow 90, the lever arm 18, which is connected to the handle by a fastener 92, pivots about the pin 26 and a braking surface 82 of lever arm 18 will contact spool rim. Braking surface 82 has been shaped to make more surface available for contact with spool rim 72 than if the braking surface were a butt end. A layer of material may be placed on the brake end of a lever arm. The material can be chosen for wear quality or based upon its coefficient of friction when applied to the reel spool rim. Alternately, the brake end may be textured to provide a desirable coefficient of friction. Lever arm stanchion 30 is maintained in a rigidly fixed position with respect to the reel 10 by stanchion fasteners 38 and 40.

While an illustrative embodiment of the invention has been described above, it is, of course, understood that various modifications will be apparent to those of ordinary skill in the art. Such modifications are within the spirit and scope of the invention, which is limited and defined only by the appended claims.

I claim:

1. In a big game spool fishing reel of the type comprising a reel body and a reel spool having two cylindrical outer rims and mounted in said reel body, the improvement comprising a rim acting reel brake comprising:
   (a) a handle;
   (b) two lever arms, each with two ends, said lever arms comprising:
      (i) means engaging said handle at one end of each lever arm;
      (ii) reel spool outer rim engaging means on the other end of each of said lever arms; and
      (iii) arm pivot means on each arm positioned between said means to engage said handle and said reel spool outer rim engaging means and positioned closer to said reel spool outer rim engaging means than said means to engage said handle; and
   (c) two lever arm stanchions rigidly affixed to said fishing reel body and each lever arm stanchion having a stanchion pivot means engaging one of said lever arms at the lever arm pivot means, wherein said lever arm stanchions are rigidly affixed to said reel body at a position where said reel spool outer rim engaging means on said lever arms may be brought into contact with said two spool cylindrical outer rims in response to the application of force to said handles.

2. An improved fishing reel as claimed in claim 1, wherein said transverse handle is proportioned and dimensioned to be grasped by an entire hand.

3. An improved fishing reel as claimed in claim 2, wherein said rim acting reel brake is positioned on said fishing reel such that said level arm stanchions are affixed to a portion of said reel at least one-quarter of the circumference of said fishing reel from said attachment means for a fishing rod.

4. An improved fishing reel as claimed in claim 3, wherein said fishing reel is attached to a fishing rod with a rod tip end and butt end, said rim acting reel brake being on the rod tip side of said fishing reel and said rim acting reel brake being configured dimensioned and oriented so as to be used by pulling said handle away from the rod.

5. An improved fishing reel as claimed in claim 1, wherein said reel spool engaging means are said opposite ends of the lever arms and are shaped to maximize the surface area available for contact with said reel spool rims by forming said opposite ends as arcs having a radius substantially the same as that of the reel spool rims.

6. An improved fishing reel as claimed in claim 5, wherein said surface area available for contact has a layer of a material providing a desired coefficient of friction.

7. An improved fishing reel as claimed in claim 5, wherein said increased surface area is textured.

8. An improved fishing reel as claimed in claim 1, wherein said fishing reel further comprises a belt hooking means.

9. An improved fishing reel as claimed in claim 1, wherein said reel brake further comprises a spring return means acting to disengage said reel spool engaging means from said spool rims when no force is placed on said transverse handle.

10. In a big game spool fishing reel of the type comprising an attachment means for a fishing rod, a reel body and a reel spool having two rims with cylindrical outer surfaces mounted in said reel body the improvement comprising a rim acting reel brake comprising:
 (a) a transverse handle proportioned and dimensioned to be grasped by an entire hand;
 (b) two lever arms, each with two ends and a thickness, said lever arms comprising:
  (i) means to engage said transverse handle near one end of each of said lever arms;
  (ii) reel spool engaging means at the opposite ends of each of said lever arms; and
  (iii) an arm pivot pin hole defined by each arm positioned between said means to engage said transverse handle and said reel spool engaging means and positioned closer to said reel spool engaging means than said means to engage said transverse handle;
 (c) two pins, each dimensioned and proportioned to protrude from one of said arm pivot pin holes, said pins having a length greater than said lever arms thickness;
 (d) two lever arm stanchions rigidly affixed to said fishing reel body and each lever arm stanchion defining a stanchion pivot pin hole, such as to engage one of said pins when said pin is placed in one of said lever arm pivot pin holes, wherein said lever arm stanchions are rigidly affixed to said reel body at a position where said reel spool engaging means on said lever arms may each engage upon said spool rim cylindrical outer surface based upon the pivoting action of said lever arms when said transverse handle is moved; and
 (e) spring return means acting to disengage said reel spool engaging means from said spool rims when no force is placed on said transverse handle.

11. An improved fishing reel as claimed in claim 10, wherein said reel spool engaging means are said opposite ends of the lever arms and are shaped to maximize the surface area available for contact with said reel spool rims by forming said opposite ends as arcs having a radius substantially the same as that of the reel spool rims.

12. An improved fishing reel as claimed in claim 11, wherein said reel spool engagement means has a layer of a material providing a desired coefficient of friction.

13. An improved fishing reel as claimed in claim 12, wherein increased surface area is textured.

14. An improved fishing reel as claimed in claim 10, wherein said rim acting reel brake is positioned on said fishing reel such that said lever arm stanchions are affixed to a portion of said reel at least one-quarter of the circumference of said fishing reel from said attachment means for a fishing rod.

15. An improved fishing reel as claimed in claim 14, wherein said fishing reel is attached to a fishing rod with a rod tip end and butt end, said rim acting reel brake being on the rod tip side of said fishing reel and said rim acting reel brake being configured, dimensioned and oriented so as to be used by pulling said handle away from the rod.

16. An improved fishing reel as claimed in claim 10, wherein said fishing reel further comprises a belt hooking means.

17. An improved fishing reel as claimed in claim 10, wherein said spool rims have both cylindrical outer surfaces and inner sloping surfaces and said reel spool engaging means are configured, dimensioned and proportioned to contact both said inner sloping surfaces and said cylindrical outer surfaces.

18. An improved fishing reel as claimed in claim 10, wherein said spool rims have an inner sloping surface and outer edges and said reel spool engaging means are shaped to contact both said inner sloping surfaces and said outer edges.

19. In a big game spool fishing reel of the type comprising an attachment means for a fishing rod, a reel body and a reel spool having two cylindrical outer rims the improvement comprising a rim acting reel brake comprising:
 (a) a transverse handle;
 (b) two lever arms, each with two ends, said lever arms comprising:
  (i) means to engage said transverse handle near one end of each of said lever arms;
  (ii) reel spool rim engaging means at the opposite ends of each of said lever arms; and
  (iii) arm pivot means on each arm positioned between said means to engage said transverse handle and said reel spool rim engaging means and positioned closer to said reel spool rim engaging means than said means to engage said transverse handle wherein these components are chosen from strong materials to withstand the application of great force; and
 (c) two lever arm stanchions rigidly affixed to said fishing reel body and each lever arm stanchion having a stanchion pivot means engaging one of said lever arms at the lever arm pivot means, wherein said lever arm stanchions are rigidly affixed to said reel body at a position where said reel spool engaging means on said lever arms may each engage upon one of said cylindrical outer rims in response to the pivoting action of said lever arms when said transverse handle is moved.

20. An improved fishing reel as claimed in claim 10, wherein said arm pivot means and said stanchion pivot means both comprise holes and wherein said fishing reel further comprises two pins, each one connecting an arm pivot means to a stanchion pivot means.

21. Fishing apparatus, comprising:
(a) a reel body;
(b) a pole mounting member on said reel body;
(c) a spool mounted on said reel body, said spool comprising:
   (i) a spindle rotatably mounted in said reel body;
   (ii) a pair of line retaining sidewalls with circular edges;
(d) stanchions mounted on said reel body;
(e) two lever arms, each one of said lever arms mounted on one of said stanchions, each of said lever arms having first and second ends, said stanchions being positioned so that said second ends are in a facing spaced relationship to each other at opposite sides of said reel body;
(f) brake means at said first end of each of said two lever arms; and
(g) an elongated handle secured to each of said second ends and extending substantially parallel to said spindle and positioned at an angular distance with respect to said mounting member and at a radial distance with respect to said spindle sufficient to allow said elongated handle to be grasped by a hand of a fisherman with the thumb and other fingers of said hand extending around and gripping said elongated handle.

22. Fishing apparatus as in claim 21, further comprising a rod secured to said reel, wherein said first ends of said lever arms generally extend toward a butt end of said rod and said second ends generally extend toward the opposite end of said rod whereby breaking occurs in response to the pulling of said elongated handle toward said butt end.

* * * * *